United States Patent
Walch et al.

[11] Patent Number: 5,901,537
[45] Date of Patent: May 11, 1999

[54] CUTTING MACHINE WITH A DEVICE FOR LOCKING THE CUTTING MECHANISM

[75] Inventors: Martin Walch, Dettwiller; Bernard Wattron, Haegen, both of France

[73] Assignee: Kuhn S.A., Saverne, France

[21] Appl. No.: 08/863,430

[22] Filed: May 27, 1997

[30] Foreign Application Priority Data

May 28, 1996 [FR] France ................................ 96 06697

[51] Int. Cl.⁶ .................................................. A01D 34/66
[52] U.S. Cl. ................................ 56/15.2; 56/6; 56/15.7; 56/DIG. 14
[58] Field of Search .................. 56/6, 15.8, 15.9, 56/13.6, 7, 15.1, 15.2, 16.3, DIG. 14

[56] References Cited

U.S. PATENT DOCUMENTS

| | | |
|---|---|---|
| 3,751,889 | 8/1973 | Overesch ....................................... 56/6 |
| 5,060,462 | 10/1991 | Helfer et al. . |
| 5,094,063 | 3/1992 | Wattron et al. . |
| 5,107,663 | 4/1992 | Wattron et al. . |
| 5,199,249 | 4/1993 | Wattron et al. . |
| 5,199,250 | 4/1993 | Ermacora et al. . |
| 5,357,737 | 10/1994 | Ermacora et al. . |
| 5,417,042 | 5/1995 | Walch et al. . |
| 5,423,165 | 6/1995 | Walch et al. . |
| 5,507,136 | 4/1996 | Walch et al. . |
| 5,522,208 | 6/1996 | Wattron et al. . |
| 5,724,794 | 3/1998 | Wolff ............................................. 56/6 |

FOREIGN PATENT DOCUMENTS

| | | |
|---|---|---|
| 556 143 | 8/1993 | European Pat. Off. . |
| 655 186 | 5/1995 | European Pat. Off. . |
| 709 018 | 5/1996 | European Pat. Off. . |
| 1 582 356 | 4/1970 | Germany . |
| 2129 804 | 12/1972 | Germany . |
| 88 03 171 | 6/1988 | Germany . |
| 9202216 | 3/1994 | Netherlands . |
| 2 157 936 | 11/1985 | United Kingdom . |

*Primary Examiner*—Heather Shackelford
*Attorney, Agent, or Firm*—Oblon, Spivak, McClelland, Maier & Neustadt, P.C.

[57] ABSTRACT

A cutting machine which includes a hitching structure supporting, via a suspension arm, an elongated cutting mechanism connected to the suspension arm by one articulation of horizontal longitudinal axis pointing in the direction of travel during work, and a locking device intended in the transport position to lock automatically this one articulation. The locking device includes a connecting member connected on the one hand to the cutting mechanism by another articulation of geometric axis substantially parallel to the longitudinal axis of the one articulation, and on the other hand to the hitching structure by a connection allowing, in the work position, a movement of the connecting member with respect to the hitching structure, and preventing, in the transport position, a movement of the connecting member with respect to the hitching structure.

24 Claims, 5 Drawing Sheets

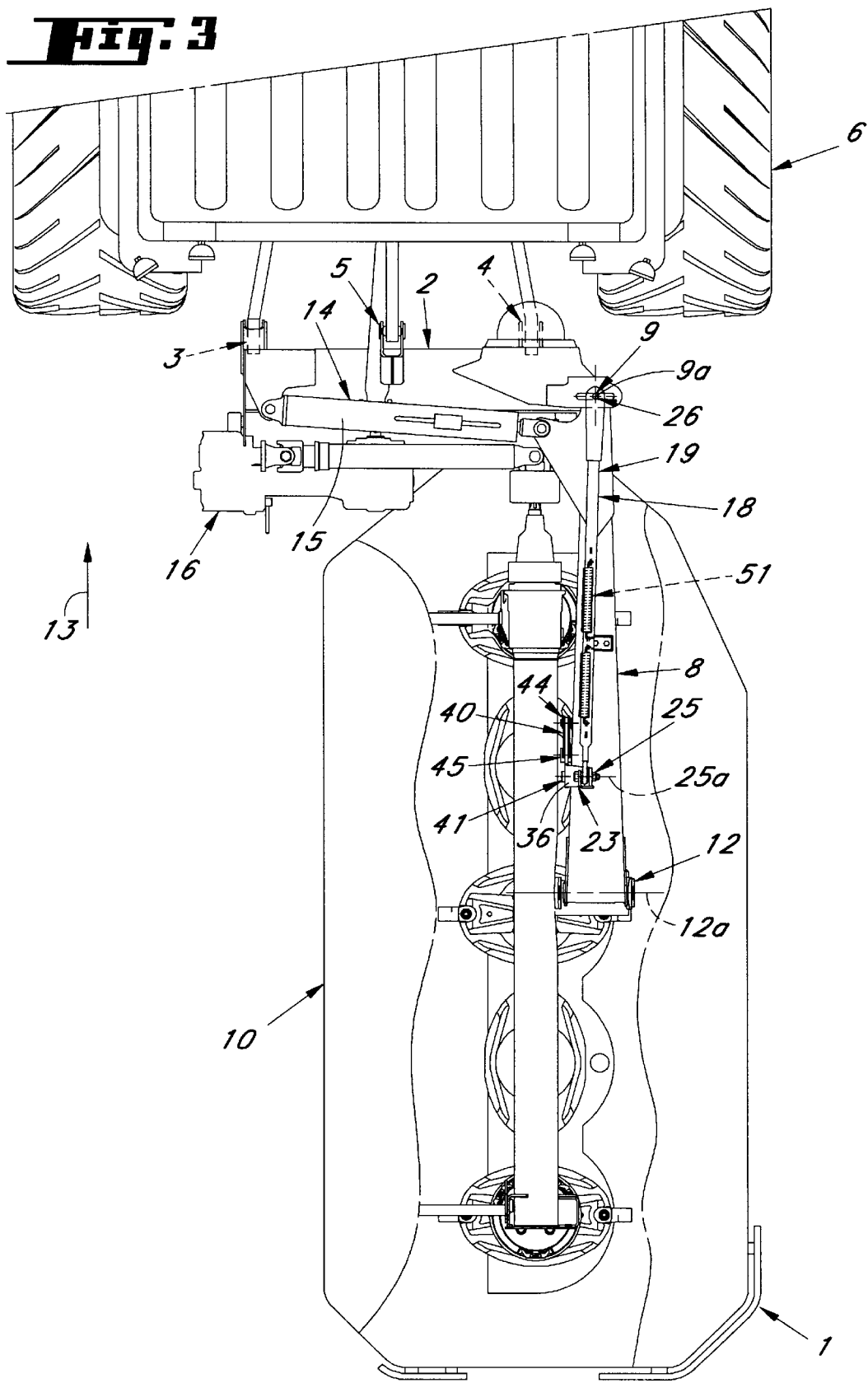

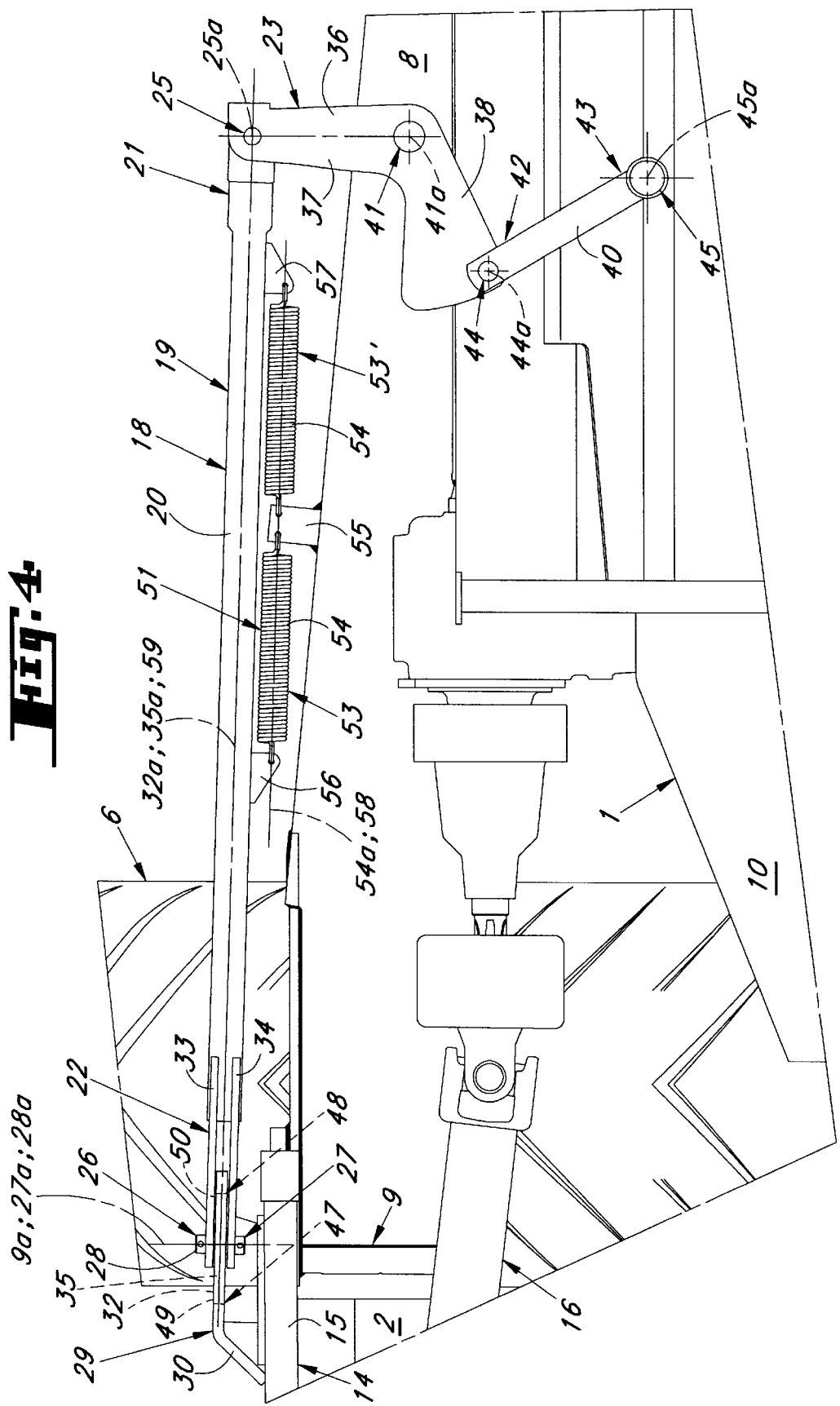

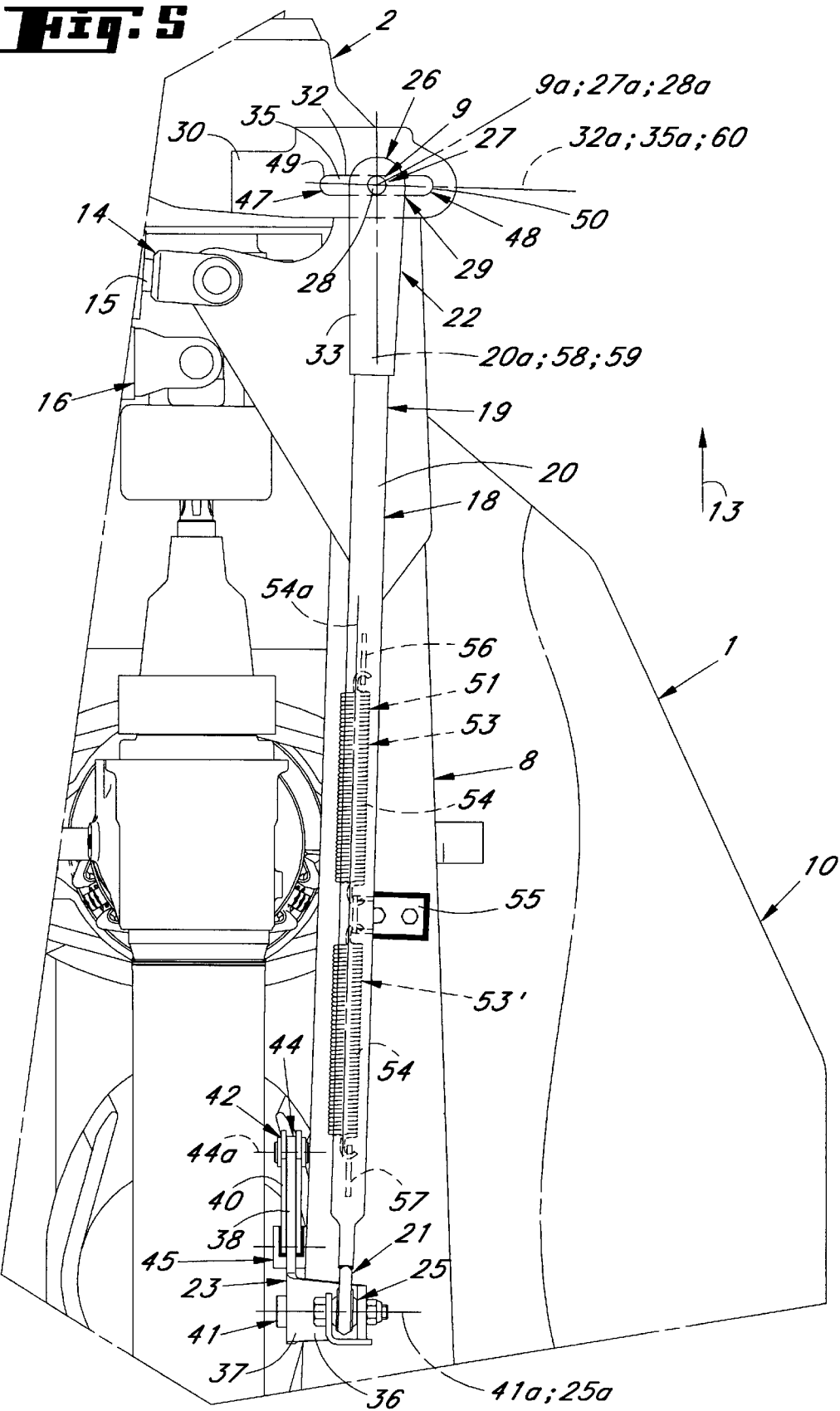

5,901,537

CUTTING MACHINE WITH A DEVICE FOR LOCKING THE CUTTING MECHANISM

BACKGROUND OF THE INVENTION

1. Field of the Invention

The present invention relates to a machine for cutting plants including:

- a hitching structure intended to be connected to a motor vehicle;
- a cutting mechanism extending, during work, transversely to the direction of travel during work (work position) and, during transport, at least substantially in the direction of travel during work (transport position);
- a suspension arm connected on the one hand to the hitching structure by means of a first articulation of upward-pointing longitudinal axis and on the other hand to the cutting mechanism by means of a second articulation of longitudinal axis pointing at least substantially in the direction of travel during work when said cutting mechanism is in the work position;
- a locking device which in the transport position allows the pivoting of the cutting mechanism about the longitudinal axis of the second articulation to be locked and which includes a connecting member connected on the one hand directly or indirectly to the cutting mechanism and on the other hand to the hitching structure.

2. Discussion of the Background

Such a machine for cutting plants is disclosed in document EP-A-0 655 186.

This known cutting machine, broadly speaking, includes a hitching structure, a cutting mechanism, a suspension arm and a locking device.

The suspension arm is connected to the hitching structure by means of a first articulation of upward-pointing longitudinal axis so that it can be pivoted into a work position and into a transport position about said longitudinal axis.

The suspension arm is also connected to the cutting mechanism by means of a second articulation of substantially horizontal longitudinal axis so that said cutting mechanism can pivot about said longitudinal axis so as to be able to follow the lie of the land during work.

The locking device for its part is intended to lock, in the transport position, the pivoting of the cutting mechanism about the longitudinal axis of the second articulation and to allow said pivoting in the work position. For this, the locking device includes a pivoting plate connected on the one hand to the cutting mechanism by means of an additional articulation of longitudinal axis parallel to the longitudinal axis of the second articulation and, on the other hand, to the suspension arm by means of a connection. This connection is composed of a slot having a first part which is substantially vertical and a second part which is substantially horizontal and at right angles to the first part. This connection additionally includes a guide shaft fixed on the suspension arm, which guide shaft extends into the slot in such a way that in the work position the first part of said slot can move over said guide shaft to allow pivoting of the cutting mechanism about the longitudinal axis of the second articulation.

The locking device is also provided with an actuating means connected on the one hand to the pivoting plate and on the other hand to the hitching structure in such a way that when the suspension arm and the cutting mechanism are pivoted into the transport position about the longitudinal axis of the first articulation, said actuating means acts on the pivoting plate to make it pivot about the longitudinal axis of the additional articulation. For this, the second part of the slot becomes housed over the guide shaft allowing the cutting mechanism to be fixed to the suspension arm.

When the suspension arm and the cutting mechanism are pivoted into the work position, the actuating means stops acting on the pivoting plate, which is returned to its work position where the first part of the slot can move over the guide shaft, by means of an elastic element.

Most of the locking device, especially the pivoting plate and the guide shaft, is situated just above the cutting mechanism, between the latter and the suspension arm.

It is well known by those skilled in the art that the upper part of the cutting mechanism is particularly exposed to the plants, which means that there is a risk of the correct operation of the locking device being compromised.

Furthermore, the means of actuating the locking device of this known cutting machine consists of a string which becomes slack when it stops acting on the pivoting plate in the work position. When the string is slack it dangles down toward the ground along the suspension arm, and risks hampering correct operation. This is because there is a risk of this string becoming caught up in the fodder or in a moving part such as, for example, the wheel of the motor vehicle to which the cutting machine is hitched. In addition, when the cutting machine is transported, the string is subjected to fairly high stresses, especially when the motor vehicle to which the cutting machine is hitched runs over ruts, and there is a risk of said string breaking.

The design of this known locking device is relatively weak, and there is the risk that this will lead to fairly steep costs.

SUMMARY OF THE INVENTION

The object of the present invention is to overcome the drawbacks of the known cutting machine while striving to produce a simple and reliable cutting machine.

For this, the machine for cutting plants is one wherein the connecting member is connected directly or indirectly to the cutting mechanism by means of a third articulation having a geometric axis at least substantially parallel to the longitudinal axis of the second articulation and wherein a connecting means secured to the hitching structure is provided, this connecting means:

- allowing, in the work position, a movement of the connecting member with respect to the hitching structure, and
- preventing, in the transport position, a movement of the connecting member with respect to the hitching structure.

Such a machine for cutting plants is simple and reliable and has no parts which risk hampering operations.

The invention also relates to the following characteristics taken in isolation or in any technically possible combination:

- the connecting member is connected to the hitching structure by means of the connecting means which:
  - allows, in the work position, a movement of the connecting member with respect to the hitching structure transversely to the direction of travel during work; and
  - prevents, in the transport position, a movement of the connecting member with respect to the hitching structure in the direction of travel during work.
- the connecting means connecting the connecting member to the hitching structure includes a fourth articulation having an upward-pointing geometric axis;
- in the normal work position (cutting mechanism extending horizontally), the geometric axis of the fourth articulation is at least substantially coincident with the longitudinal axis of the first articulation; such an arrangement makes it possible to pivot the cutting mechanism and the suspension arm from the work position into the transport position or vice versa about the longitudinal axis of the first articulation without altering the relative position of the connecting member with respect to the suspension arm and also without altering the relative position of the cutting mechanism with respect to said suspension arm; in particular, such an arrangement makes it possible to keep the cutting mechanism in a substantially horizontal position in the transport position and this has the advantage, when transporting the cutting machine, of keeping substantially the same ground clearance in the wind rowing position (cutting mechanism extending transversely to the direction of travel during work and above the ground);

the connecting means connecting the connecting member to the hitching structure includes a journal connected to the connecting member and extending through a guide device connected to the hitching structure;

the guide device includes a slot extending transversely to the direction of travel during work;

the slot is at least substantially rectilinear;

the longitudinal axis of the slot extends at least substantially at right angles to the direction of travel during work and at least substantially horizontally; such a positioning of the slot makes it possible, in the work position, for the connecting member to move transversely to the direction of travel during work and in the transport position prevents said connecting member from moving significantly;

the longitudinal axis of the slot intersects the longitudinal axis of the first articulation;

the longitudinal axis of the slot intersects the longitudinal axis of the first articulation at least substantially at right angles;

the pivoting of the cutting mechanism about the longitudinal axis of the second articulation is limited in each direction by a stop;

the stops are situated close to the connecting means connecting the connecting member to the hitching structure;

the stops are formed by the two ends of the slot;

a lever mechanism is provided, this being situated between the cutting mechanism and the suspension arm, the connecting member being connected to said lever mechanism;

the lever mechanism includes a pivoting lever with two branches:

which is connected, at its middle, to the suspension arm by means of a fifth articulation of longitudinal axis at least substantially parallel to the longitudinal axis of the second articulation;

whose first branch is connected to the connecting member by means of the third articulation; and whose second branch is connected directly or indirectly to the cutting mechanism; such an arrangement makes it possible to convert the pivoting of the cutting mechanism about the longitudinal axis of the second articulation into a substantially rectilinear movement of the connecting member;

the lever mechanism additionally includes a link rod situated between the pivoting lever and the cutting mechanism, said link rod being connected on the one hand to the pivoting lever by means of a sixth articulation and on the other hand to the cutting mechanism by means of a seventh articulation, the longitudinal axes of said sixth and seventh articulations being at least substantially parallel to the longitudinal axis of the second articulation;

the seventh articulation is an elastic articulation;

the machine for cutting plants includes a stabilizer device intended to return the cutting mechanism to a predetermined position when said cutting mechanism is in the work position; such a stabilizer device additionally makes it possible, when maneuvering at the end of the field, when the cutting mechanism is suspended transversely to the direction of travel during work above the ground by means of the suspension arm, to keep said cutting mechanism in the predetermined position;

the predetermined position is the normal work position, that is to say the one in which the cutting mechanism extends at least substantially horizontally;

the stabilizer device includes two elastic elements acting in opposite directions;

each elastic element is situated between the connecting member and the suspension arm;

the intensity of the action provided by the stabilizer device is adjustable;

the connecting member extends above the suspension arm; such a position of said connecting member advantageously allows it to be kept away from the plants in order not to compromise the correct operation of the locking device;

the connecting member consists of a rod extending at least substantially parallel to the suspension arm.

BRIEF DESCRIPTION OF THE DRAWINGS

Further subjects and characteristics of the invention will emerge from the description hereafter with reference to the appended drawings which represent, by way of non limiting example, one embodiment of the cutting machine according to the invention.

In these drawings:

FIG. 3 represents a top view of the cutting machine of FIG. 1, in the transport position;

FIG. 4 represents a partial enlargement of FIG. 1;

FIG. 5 represents a partial enlargement of FIG. 3.

DESCRIPTION OF THE PREFERRED EMBODIMENT

The cutting machine 1 as represented in FIGS. 1 to 5 is similar to the cutting machine described in document FR 96 03122. For further details reference may, if necessary, be made to the text of said document.

Figure 1:
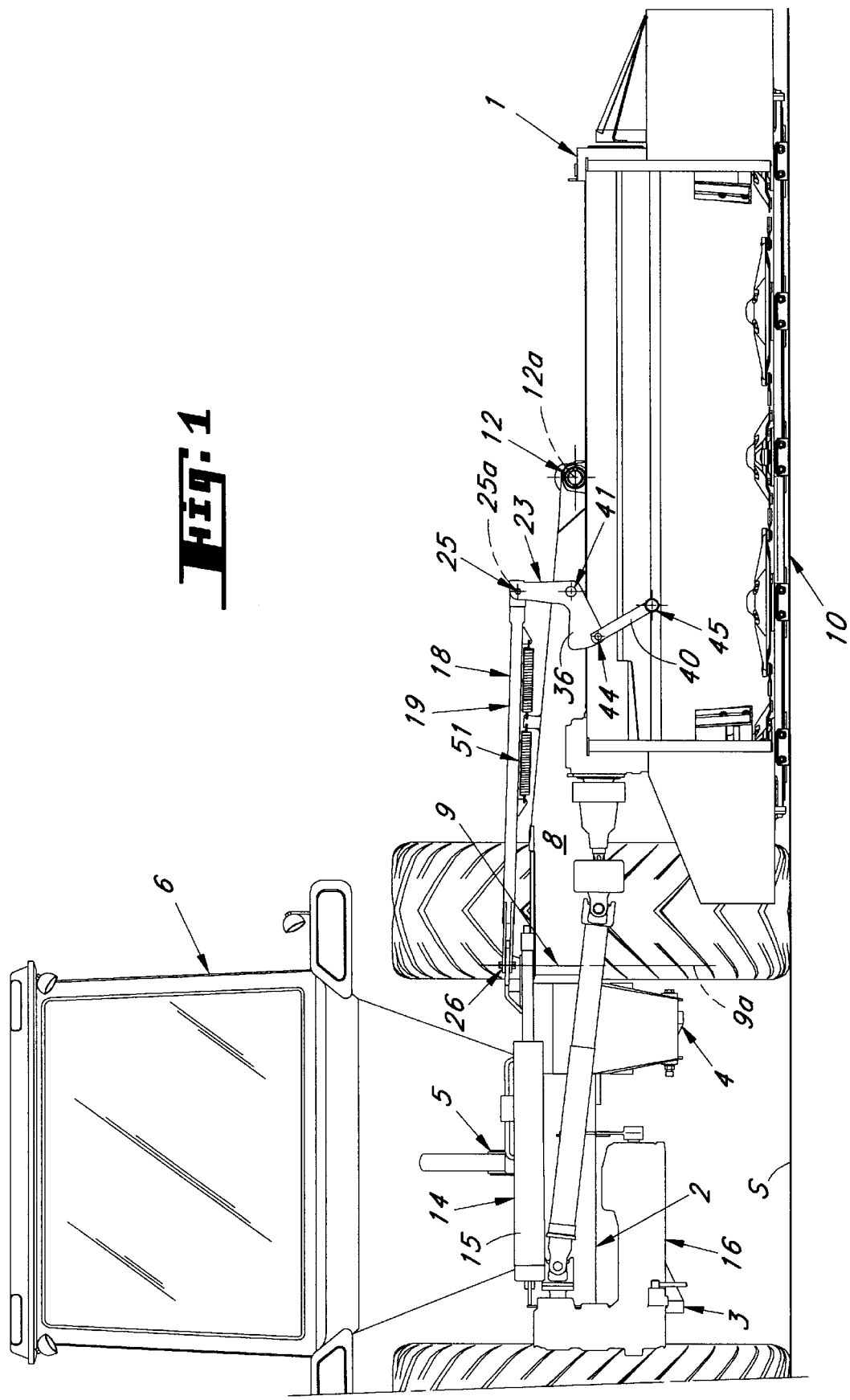
FIG. 1 represents, in the work position, a rear view of the cutting machine according to the invention, connected to a motor vehicle.
Figure 2:
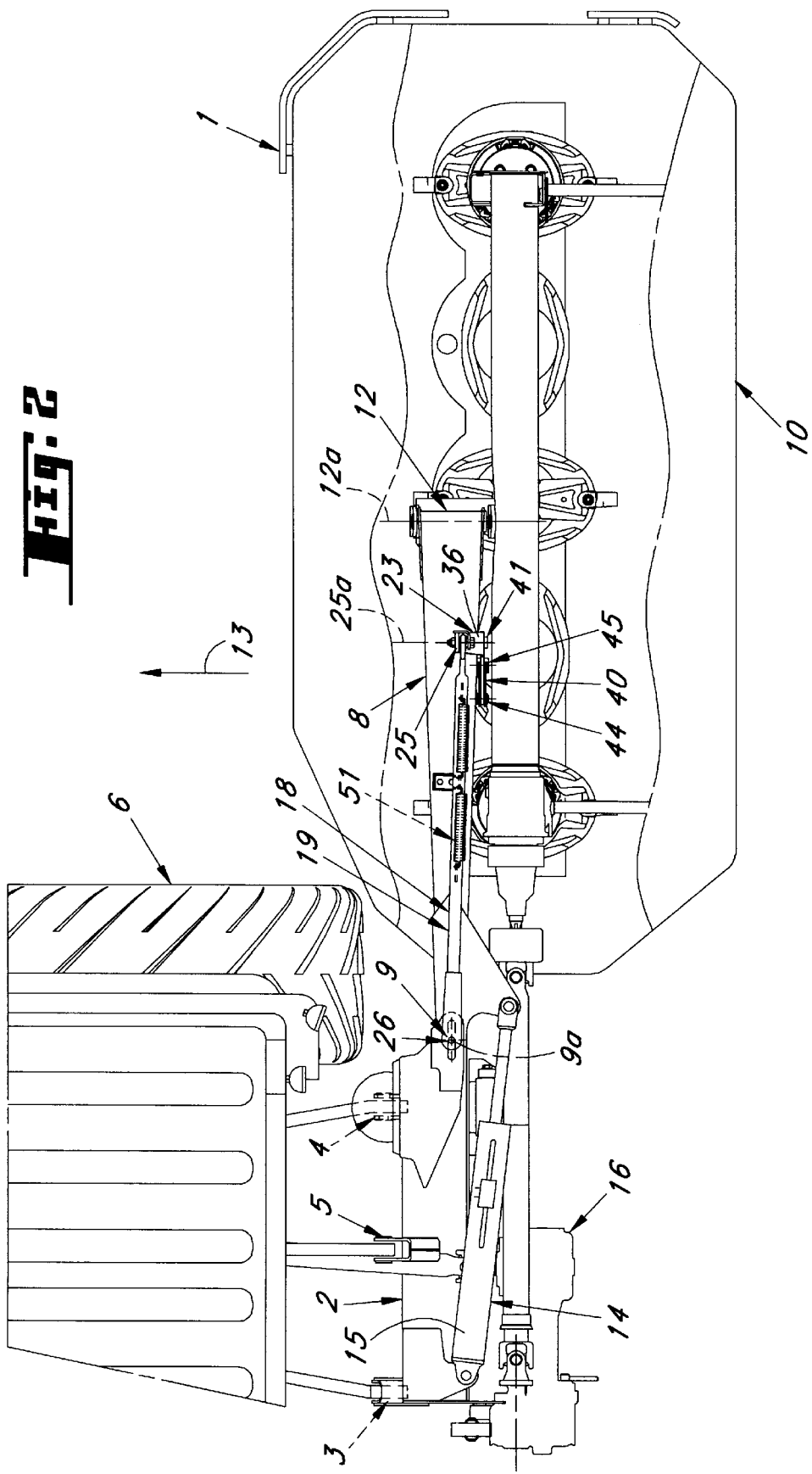
FIG. 2 represents a top view of the cutting machine of FIG. 1.

The cutting machine 1, as represented in FIGS. 1 to 3, is intended to cut and/or shred plant matter. It includes a hitching structure 2 equipped with two lower hitching points 3, 4 and with one upper hitching point 5, by means of which points said cutting machine 1 is connected to a motor vehicle 6. A suspension arm 8 is connected to the hitching structure 2 by means of a first articulation 9 of at least substantially vertical longitudinal axis 9a. A cutting mechanism 10 is connected to the end of the suspension arm 8 by means of a second articulation 12 of longitudinal axis 12a at least substantially horizontal and at least substantially parallel to the direction of travel during work 13 when said cutting mechanism 10 is in the work position as represented in FIGS. 1 and 2.

In the work position, the cutting mechanism 10 extends transversely to the direction of travel during work 13 and rests on the ground S, in the transport position, at least substantially in said direction of travel during work 13. For this, an operating means 14 is provided and this includes a hydraulic ram 15 intended to pivot the suspension arm 8 and the cutting mechanism 10 from the work position into the transport position, and vice versa, about the longitudinal axis 9a of the first articulation 9.

The cutting machine 1 is also provided with a transmission device 16 intended to drive the cutting mechanism 10, said transmission device 16 itself being driven by the motor vehicle 6.

It will also be observed that the cutting machine 1 includes a locking device 18. This locking device 18 makes it possible, in the transport position, to lock the pivoting of the cutting mechanism 10 about the longitudinal axis 12a of the second articulation 12 and to allow said pivoting in the work position. For this, the locking device 18 includes a connecting member 19 which, in the example shown, consists of a rod 20 extending substantially parallel to the suspension arm 8 and above it. In the example shown, this rod 20 is rigid and is connected at one 21 of its ends 21, 22 to a lever mechanism 23 by means of a third articulation 25 including a geometric axis 25a at least substantially parallel to the longitudinal axis 12a of the second articulation 12. In the example shown, the third articulation 25 is a spherical articulation making it possible to avoid prejudicial excessive play in said articulation. It will be noted that the lever mechanism 23 is additionally connected to the cutting mechanism 10. This lever mechanism 23 will be described in greater detail later.

At the other end 22, the rod 20 is connected to the hitching structure 2 by a connecting means 26 situated higher up than the first articulation 9.

The connecting means 26:

allows, in the work position, a movement of said rod 20 with respect to the hitching structure 2 transversely to the direction of travel during work 13, and prevents, in the transport position, a movement of said rod 20 with respect to the hitching structure 2 in the direction of travel during work 13.

The connecting means 26 includes a fourth articulation 27 having an upward-pointing geometric axis 27a. In the normal work position (cutting mechanism 10 extending transversely to the direction of travel during work 13 and resting horizontally on the ground S), the geometric axis 27a of the fourth articulation 27 is at least substantially coincident with the longitudinal axis 9a of the first articulation 9.

The connecting means 26 also includes a journal 28 of longitudinal axis 28a coincident with the geometric axis 27a of the fourth articulation 27. This journal 28 is connected to the rod 20 and extends through a guide device 29 connected to the hitching structure 2. In the example shown, this guide device 29 is formed by a support 30 fixed to the hitching structure 2, in which support there is a slot 32. This slot 32 extends transversely to the direction of travel during work 13 and is at least substantially rectilinear. More specifically, the longitudinal axis 32a of the slot 32 extends at least substantially at right angles to the direction of travel during work 13 and at least substantially horizontally above the first articulation 9. It will also be observed that the longitudinal axis 32a of the slot 32 intersects the longitudinal axis 9a of the first articulation 9 substantially at right angles.

In the light of FIGS. 4 and 5, it can be seen more clearly that the other end 22 of the rod 20 has two flanges 33, 34 between which the support 30 of the guide device 29 extends. The journal 28 extends right through the two flanges 33, 34 and through the slot 32 provided in the support 30. For this, in the embodiment shown, the journal 28 is of cylindrical shape and the slot 32 is an oblong hole 35 of longitudinal axis 35a coincident with the longitudinal axis 32a of the slot 32. The journal 28 and the oblong hole 35 are arranged in such a way that in the work position, said journal 28 can move in the oblong hole 35 along the longitudinal axis 35a, and when the device is placed in the transport position, said journal 28 can pivot about its longitudinal axis 28a.

The lever mechanism 23, to which the end 21 of the rod 20 is connected by means of the third articulation 25, is situated between the cutting mechanism 10 and the suspension arm 8. This lever mechanism 23 converts the pivoting of the cutting mechanism 10 about the longitudinal axis 12a of the second articulation 12 into a movement of the rod 20 which is substantially rectilinear, horizontal and transverse to the direction of travel during work 13. For this, the lever mechanism 23 includes a pivoting lever 36 with two branches 37, 38 and a connecting rod 40.

The pivoting lever 36 is connected, at its middle, to the suspension arm 8 by means of a fifth articulation 41 of longitudinal axis 41a at least substantially parallel to the longitudinal axis 12a of the second articulation 12. The first branch 37 of the pivoting lever 36 is connected to the end 21 of the rod 20 by means of the third articulation 25 described earlier, while the second branch 38 of the pivoting lever 36 is connected to one 42 of the ends 42, 43 of the connecting rod 40 by means of a sixth articulation 44 of longitudinal axis 44a at least substantially parallel to the longitudinal axis 12a of the second articulation 12. In the light of FIG. 4 it may be seen that in the normal work position the third articulation 25 lies in one and the same vertical plane pointing in the direction of travel during work 13 as the fifth articulation 41. Said third articulation 25 lies above the fifth articulation 41, while the sixth articulation 44 lies somewhat below said fifth articulation 41. Said sixth articulation 44 also lies in a vertical plane pointing on the one hand in the direction of travel during work 13 and situated on the other hand between the fifth articulation 41 and the first articulation 9.

The connecting rod 40 is situated between the pivoting lever 36 and the cutting mechanism 10. For this, the connecting rod 40 is connected at the other 43 of its ends 42, 43 to the cutting mechanism 10 by means of a seventh articulation 45 of longitudinal axis 45a at least substantially parallel to the longitudinal axis 12a of the second articulation 12. This seventh articulation 45 lies, as can be seen in FIG. 4, in the normal work position, on the one hand in a horizontal plane situated below the sixth articulation 44 and on the other hand in a vertical plane situated between said sixth articulation 44 and the fifth articulation 41.

In the example shown, the seventh articulation 45 is an elastic articulation which, in the work position and in the transport position, damps out the various shocks to which the locking device 18 is subjected.

In a top view of the cutting machine 1 in the normal work position as represented in FIG. 2, it can be seen that the fifth articulation 41 and the sixth articulation 44 lie substantially in one and the same transverse vertical plane, preferably substantially at right angles to the direction of travel during work 13, while the third articulation 25 lies in front of said plane and the seventh articulation 45 lies behind said plane.

It will also be noted that in the work position the pivoting of the cutting mechanism 10 about the longitudinal axis 12a of the second articulation 12 is limited in each direction by a stop 47, 48. Each stop 47, 48 is situated close to the connecting means 26. More specifically, each stop 47, 48 is formed by one end 49, 50 of the oblong hole 35.

When the cutting mechanism 10 pivots about the longitudinal axis 12a into one of the extreme positions (cutting mechanism 10 inclined to the maximum extent with respect to the suspension arm 8), the journal 28 of the connecting means 26 rests against the corresponding end 49, 50 of the oblong hole 35.

In the light of the various figures it can also be seen that the cutting machine 1 includes a stabilizer device 51 intended to return the cutting mechanism 10 to a predetermined position when said cutting mechanism 10 is in the work position. In the example shown, the stabilizer device 51 is arranged at the locking device 18 and the predetermined position is the normal work position, namely the one in which the cutting mechanism 10 extends at least substantially horizontally.

The stabilizer device 51 includes two elastic elements 53, 53' each situated between the rod 20 and the suspension arm 8. In the embodiment shown, each elastic element 53, 53' is composed of a draw-spring 54 of longitudinal axis 54a acting in opposite directions. For this, each draw-spring 54 is connected at one of its ends to a common lug 55 fixed to the suspension arm 8 and at the other end to a respective fastener 56, 57 fixed to the rod 20.

One 56 of the fasteners 56, 57 lies between the common lug 55 and the other end 22 of the rod 20 connected to the hitching structure 2 by the connecting means 26. The other fastener 57 lies between the common lug 55 and the end 21 of the rod 20 connected to the lever mechanism 23. It will also be noted that in the normal work position, each draw-spring 54 is stretched so as to give the cutting mechanism 10 a certain initial stability especially in the wind rowing position (cutting mechanism 10 extending above the cut plants or plants to be cut for maneuvers at the end of the field). It will be observed that the longitudinal axes 54a of the draw-springs 54 are coincident and that the straight line of action 58 of said draw-springs 54 is, when viewed from behind, in the work position, at least substantially parallel to a straight line 59 passing through the third and fourth articulations 25, 27 and, viewed from above, at least substantially coincident with said straight line 59.

Such an arrangement of the draw-springs 54 makes it possible in the transport position to return the journal 28 at least substantially to the middle of the oblong hole 35 to give the cutting mechanism 10 perfect stability.

The cutting machine 1 according to the present invention works as follows: when the cutting machine 1 is in the transport position as represented in FIGS. 3 and 5, the cutting mechanism 10 extends above the ground S and with the suspension arm 8, at least substantially parallel to the direction of travel during work 13, behind the hitching structure 2.

In this transport position, the longitudinal axis 20a of the rod 20 extends, when viewed from above, substantially at right angles to the longitudinal axis 35a of the oblong hole 35, which does not allow said rod 20 any movement with respect to the hitching structure 2 and which has the effect of locking the second articulation 12 and of fixing the cutting mechanism 10 to the suspension arm 8.

When the operator wishes to bring the cutting machine 1 from the transport position into the work position, he actuates the operating means 14, which has the effect of pivoting the cutting mechanism 10 and the suspension arm 8 about the longitudinal axis 9a of the first articulation 9 into the work position in which this cutting mechanism and this suspension arm extend substantially at right angles to the direction of travel during work 13. During this pivoting the rod 20 pivots about the geometric axis 27a of the fourth articulation 27 until it extends substantially at right angles to the direction of travel during work 13. In this position, the longitudinal axis 20a of the rod 20 is substantially coincident with the longitudinal axis 35a of the oblong hole 35 and this allows the journal 28 to move in said oblong hole 35. The operator then lowers the cutting machine 1 to make the cutting mechanism 10 rest on the ground S. The cutting machine 1 is in the work position. Next, the operator actuates the transmission device 16 from the motor vehicle 6 so as to drive said cutting mechanism 10.

During work, the cutting machine 1 is moved in a field covered with plants to be cut by means of the motor vehicle 6. The cutting mechanism 10 can easily adapt to the lie of the land S by pivoting especially about the longitudinal axis 12a of the second articulation 12. For this, the connecting rod 40 connected to the cutting mechanism 10 acts on the pivoting lever 36 which pivots about the longitudinal axis 41a of the fifth articulation 41, which has the effect of moving the rod 20 in a vertical plane containing the longitudinal axis 35a of the oblong hole 35. As the rod 20 moves, the journal 28 moves longitudinally in the oblong hole 35 within the limits allowed by the ends 49, 50. When the rod 20 moves, one of the draw-springs 54 tends to relax while the other draw-spring stretches further, and this has the effect always of trying to return the cutting mechanism 10 to the predetermined work position. Such an arrangement advantageously makes it possible to stiffen the pivoting of the cutting mechanism 10 about the longitudinal axis 12a of the second articulation 12, especially in the windrowing position when said cutting mechanism 10 extends above the cut plants or plants to be cut during the maneuvers at the end of the field.

When the operator wishes to bring the cutting machine 1 from the work position into the transport position, he cuts the drive to the cutting mechanism 10, raises the latter above the ground S and actuates the operating means 14 to pivot said cutting mechanism 10 and the suspension arm 8 about the longitudinal axis 9a of the first articulation 9 until the transport position is reached.

Finally, various modifications remain possible, especially as regards the construction of the various elements, or by substituting technical equivalents, without in any way departing from the field of protection defined by the claims.

Thus, it is perfectly possible to envisage for the intensity of the action provided by the stabilizer device 51 to be adjustable so that the predetermined position of the cutting mechanism can be altered as a function of its mass distribution. For this, it may, for example, be envisaged for the fasteners 56, 57 to be moved along the rod 20.

It is also possible to produce a stabilizer device equipped with compression springs. Thus it is conceivable for two compression springs to be arranged facing one another, each resting on the one hand on a common support fixed to the suspension arm 8 and on the other hand on a respective rest rigidly fastened to the rod 20. It is also possible to envisage the longitudinal axis of one compression spring being coincident with the longitudinal axis of the other compression spring and the longitudinal axes of said springs being coincident with the longitudinal axis 20a of the rod 20.

It is also possible to envisage adjusting the angle through which the cutting mechanism 10 pivots about the longitudinal axis 12a of the second articulation 12. For this, it is perfectly conceivable to design a guide device which has a variable-length slot.

For reasons of space or other reasons, it is also feasible to situate the slot 32 of the guide device 29 somewhere other than above the first articulation 9.

Thus, when viewed from above, by placing the slot 32 at right angles to the direction of travel during work 13 on a straight line directed at 45° with respect to said direction of travel during work 13, the cutting mechanism 10 will keep the predetermined work position in the transport position. By placing the slot 32 at right angles to the direction of travel during work 13 somewhere other than at the locations described earlier, the cutting mechanism 10 will pivot about the longitudinal axis 12a of the second articulation 12 when the cutting machine 1 is placed in the work position or transport position, that is to say that said cutting mechanism 10 will, in the transport position, occupy a relative position with respect to the suspension arm 8 which differs from the position it occupies in the work position.

Finally, it is perfectly feasible to produce the locking device 18 and/or the stabilizer device 51 in a form which is independent of the cutting machine 1 represented, so that it (they) can be fitted in the form of one or more accessories to other cutting machines of the same kind or to any machines.

What is claimed as new and desired to be secured by Letters Patent of the United States:

1. A machine for cutting plants, including:
   a hitching structure intended to be connected to a motor vehicle;
   an elongated cutting mechanism extending, in a work position transversely to a direction of travel during work and, in a transport position substantially in a direction of travel during transport;
   a suspension arm connected on the one hand to the hitching structure by means of a first articulation of upward-pointing longitudinal axis and on the other hand to the cutting mechanism by means of a second articulation of longitudinal axis pointing substantially in the direction of travel during work when said cutting mechanism is in the work position; and
   a locking device which in the transport position allows to lock automatically the pivoting of the cutting mechanism about the longitudinal axis of the second articulation by means of a connecting member connected; on the one hand to the cutting mechanism by means of a third articulation having a geometric axis substantially parallel to the longitudinal axis of the second articulation, and on the other hand to the hitching structure by means of a connecting means;
   (i) allowing, in the work position, a movement of the connecting member with respect to the hitching structure, and
   (ii) preventing, in the transport position, a movement of the connecting member with respect to the hitching structure.

2. A machine for cutting plants as claimed in claim 1, wherein the connecting means connecting the connecting member to the hitching structure
   allows, in the work position, a movement of the connecting member with respect to the hitching structure transversely to the direction of travel during work, and
   prevents, in the transport position, a movement of the connecting member with respect to the hitching structure in the direction of travel during transport.

3. A machine for cutting plants as claimed in claim 1, wherein the connecting means connecting the connecting member to the hitching structure includes a fourth articulation having an upward-pointing geometric axis.

4. A machine for cutting plants as claimed in claim 3, wherein in a normal work position (cutting mechanism extending horizontally), the geometric axis of the fourth articulation is substantially coincident with the longitudinal axis of the first articulation.

5. A machine for cutting plants as claimed in claim 3, wherein the connecting means connecting the connecting member to the hitching structure includes a journal connected to the connecting member and extending through a guide device connected to the hitching structure.

6. A machine for cutting plants as claimed in claim 5, wherein the guide device includes a slot extending transversely to the direction of travel during work.

7. A machine for cutting plants as claimed in claim 6, wherein the slot is substantially rectilinear.

8. A machine for cutting plants as claimed in claim 7, wherein a longitudinal axis of the slot extends substantially at right angles to the direction of travel during work and substantially horizontally.

9. A machine for cutting plants as claimed in claim 8, wherein the longitudinal axis of the slot intersects the longitudinal axis of the first articulation.

10. A machine for cutting plants as claimed in claim 9, wherein the longitudinal axis of the slot intersects the longitudinal axis of the first articulation substantially at right angles.

11. A machine for cutting plants as claimed in claim 1, wherein the pivoting of the cutting mechanism about the longitudinal axis of the second articulation is limited in each direction by a stop.

12. A machine for cutting plants as claimed in claim 11, wherein the stops are situated close to the connecting means connecting the connecting member to the hitching structure.

13. A machine for cutting plants as claimed in claim 12, wherein the connecting means connecting the connecting member to the hitching structure includes a journal connected to the connecting member and extending through a guide device connected to the hitching structure, said guide device including a slot extending transversely to the direction of travel during work, and wherein the stops are formed by the two ends of said slot.

14. A machine for cutting plants as claimed in claim 1, wherein there is provided a lever mechanism situated between the cutting mechanism and the suspension arm, and wherein the connecting member is connected to said lever mechanism by means of said third articulation.

15. A machine for cutting plants as claimed in claim 14, wherein the lever mechanism includes a pivoting lever with two branches, said pivoting lever being connected, at middle part thereon, to the suspension arm by means of a fifth articulation of longitudinal axis substantially parallel to the longitudinal axis of the second articulation; and wherein:
   a first branch of said pivoting lever is connected to the connecting member by means of the third articulation; and
   a second branch of said pivoting lever is connected to the cutting mechanism.

16. A machine for cutting plants as claimed in claim 15, wherein the lever mechanism additionally includes a connecting rod situated between the pivoting lever and the cutting mechanism, said connecting rod being connected on the one hand to the second branch of the pivoting lever by means of a sixth articulation, and on the other hand to the cutting mechanism by means of a seventh articulation, said sixth and seventh articulations, each having a longitudinal axis substantially parallel to the longitudinal axis of the second articulation.

17. A machine for cutting plants as claimed in claim 16, wherein the seventh articulation is an elastic articulation.

18. A machine for cutting plants as claimed in claim 1, which further includes a stabilizer device intended to return the cutting mechanism to a predetermined position when said cutting mechanism is in the work position.

19. A machine for cutting plants as claimed in claim 18, wherein said predetermined position is a normal work position with the cutting mechanism extending horizontally.

20. A machine for cutting plants as claimed in claim 18, wherein the stabilizer device includes two elastic elements acting in opposite directions.

21. A machine for cutting plants as claimed in claim 20, wherein each elastic element is situated between the connecting member and the suspension arm.

22. A machine for cutting plants as claimed in claim 18, wherein the intensity of the action provided by the stabilizer device is adjustable.

23. A machine for cutting plants as claimed in claim 1, wherein the connecting member extends above the suspension arm.

24. A machine for cutting plants as claimed in claim 1, wherein the connecting member consists of a rod extending substantially parallel to the suspension arm.

* * * * *